(12) United States Patent
Gwidt et al.

(10) Patent No.: US 11,578,677 B1
(45) Date of Patent: Feb. 14, 2023

(54) METHOD AND SYSTEM FOR DIAGNOSING COLD START EMISSION REDUCTION

(71) Applicant: GM GLOBAL TECHNOLOGY OPERATIONS LLC, Detroit, MI (US)

(72) Inventors: J. Michael Gwidt, Brighton, MI (US); Erika L Pruski, Brighton, MI (US)

(73) Assignee: GM GLOBAL TECHNOLOGY OPERATINS LLC, Detroit, MI (US)

( * ) Notice: Subject to any disclaimer, the term of this patent is extended or adjusted under 35 U.S.C. 154(b) by 0 days.

(21) Appl. No.: 17/649,056

(22) Filed: Jan. 26, 2022

(51) Int. Cl.
  *F02D 41/16* (2006.01)
  *F02D 41/22* (2006.01)
  *F02D 41/02* (2006.01)
  *F02P 9/00* (2006.01)

(52) U.S. Cl.
  CPC ......... *F02D 41/22* (2013.01); *F02D 41/0255* (2013.01); *F02D 41/16* (2013.01); *F02P 9/002* (2013.01); *F02D 2200/021* (2013.01); *F02D 2200/70* (2013.01)

(58) Field of Classification Search
  CPC ...... F02D 41/22; F02D 41/0255; F02D 41/16; F02D 2200/021; F02D 2200/70; F02P 9/002
  USPC ......... 123/676, 685, 491; 701/103–105, 112, 701/113; 73/114.69, 114.71, 114.72
  See application file for complete search history.

(56) References Cited

FOREIGN PATENT DOCUMENTS

FR 3005103 A1 * 4/2013 .............. F01N 11/00

* cited by examiner

*Primary Examiner* — Hai H Huynh
(74) *Attorney, Agent, or Firm* — Lorenz & Kopf LLP

(57) ABSTRACT

In exemplary embodiments, methods and systems are provided for controlling emissions for a drive system for a vehicle. In one embodiment, the system includes: one or more first sensors configured to measure an engine temperature pertaining to an engine of the vehicle; one or more second sensors configured to measure an ambient temperature surrounding the vehicle; one or more third sensors configured to detect an amount of running time in which the engine has been running; and a processor coupled to the one or more first sensors, the one or more second sensors, and the one or more third sensors and configured to at least facilitate controlling emissions for the drive system based on the engine temperature, the ambient temperature, and the amount of running time in which the engine has been running.

20 Claims, 2 Drawing Sheets

METHOD AND SYSTEM FOR DIAGNOSING COLD START EMISSION REDUCTION

INTRODUCTION

The technical field generally relates to the field of vehicles and, more specifically, to control of emissions in vehicles.

Vehicles today have one or more systems in place, including a catalytic converter, for controlling vehicle emissions. However, in certain situations, control of vehicle emissions may not always be optimal.

Accordingly, it is desirable to provide systems and methods for controlling emissions from vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided for controlling emissions for a drive system for a vehicle, the method including: measuring, via one or more first sensors, an engine temperature pertaining to an engine of the vehicle; measuring, via one or more second sensors, an ambient temperature surrounding the vehicle; detecting, via one or more third sensors, an amount of running time in which the engine has been running; and controlling emissions for the drive system, via a processor of the vehicle, based on the engine temperature, the ambient temperature, and the amount of running time in which the engine has been running.

Also in an exemplary embodiment, the step of controlling the emissions includes initiating cold start emission reduction control, in accordance with instructions provided by the processor, when each of the following criteria are satisfied, namely: the running time for the engine is greater than a first predetermined threshold; the ambient temperature is greater than a second predetermined threshold; and a difference between the engine temperature and the ambient temperature is less than a third predetermined threshold.

Also in an exemplary embodiment, the first predetermined threshold is equal to approximately six (6) hours; the second predetermined threshold is equal to approximately negative seven degrees Celsius (−7° C.); and the third predetermined threshold is equal to approximately fifteen degrees Celsius (15° C.).

Also in an exemplary embodiment, the step of initiating the cold start emission reduction control includes providing heating for a catalytic converter of the drive system, in accordance with the instructions provided by the processor, when each of the following criteria are satisfied, namely: the running time for the engine is greater than the first predetermined threshold; the ambient temperature is greater than the second predetermined threshold; and the difference between the engine temperature and the ambient temperature is less than the third predetermined threshold.

Also in an exemplary embodiment, the step of initiating the cold start emission reduction control includes performing diagnostics for the drive system, in accordance with the instructions provided by the processor, when each of the following criteria are satisfied, namely: the running time for the engine is greater than the first predetermined threshold; the ambient temperature is greater than the second predetermined threshold; and the difference between the engine temperature and the ambient temperature is less than the third predetermined threshold.

Also in an exemplary embodiment, the diagnostics pertain to one or more of the following: fuel pressure; idle speed control; variable valve timing and/or lift; split and/or multiple injections; charge motion control, intake runner, or swirl control valves; and electronic wastegate position.

Also in an exemplary embodiment, the step of initiating the cold start emission reduction control includes increasing idle speeds for the engine, in accordance with the instructions provided by the processor, when each of the following criteria are satisfied, namely: the running time for the engine is greater than the first predetermined threshold; the ambient temperature is greater than the second predetermined threshold; and the difference between the engine temperature and the ambient temperature is less than the third predetermined threshold.

Also in an exemplary embodiment, the step of initiating the cold start emission reduction control includes reducing spark for the engine, in accordance with the instructions provided by the processor, when each of the following criteria are satisfied, namely: the running time for the engine is greater than the first predetermined threshold; the ambient temperature is greater than the second predetermined threshold; and the difference between the engine temperature and the ambient temperature is less than the third predetermined threshold.

Also in an exemplary embodiment, the step of initiating the cold start emission reduction control includes modifying control of one or more of the following: fuel pressure, valve timing, and waste gate control, in accordance with the instructions provided by the processor, when each of the following criteria are satisfied, namely: the running time for the engine is greater than the first predetermined threshold; the ambient temperature is greater than the second predetermined threshold; and the difference between the engine temperature and the ambient temperature is less than the third predetermined threshold.

In another exemplary embodiment, a system is provided for controlling emissions for a drive system for a vehicle, the system including: one or more first sensors configured to measure an engine temperature pertaining to an engine of the vehicle; one or more second sensors configured to measure an ambient temperature surrounding the vehicle; one or more third sensors configured to detect an amount of running time in which the engine has been running; and a processor coupled to the one or more first sensors, the one or more second sensors, and the one or more third sensors and configured to at least facilitate controlling emissions for the drive system based on the engine temperature, the ambient temperature, and the amount of running time in which the engine has been running.

Also in an exemplary embodiment, the processor is further configured to at least facilitate controlling the emissions by initiating cold start emission reduction control, in accordance with instructions provided by the processor, when each of the following criteria are satisfied, namely: the running time for the engine is greater than a first predetermined threshold; the ambient temperature is greater than a second predetermined threshold; and a difference between the engine temperature and the ambient temperature is less than a third predetermined threshold.

In another exemplary embodiment, a vehicle is provided that includes a drive system and a control system. The control system includes: one or more first sensors configured to measure an engine temperature pertaining to an engine of the vehicle; one or more second sensors configured to measure an ambient temperature surrounding the vehicle; one or more third sensors configured to detect an amount of running time in which the engine has been running; and a processor coupled to the one or more first sensors, the one or more second sensors, and the one or more third sensors and configured to at least facilitate controlling emissions for the drive system based on the engine temperature, the ambient temperature, and the amount of running time in which the engine has been running.

Also in an exemplary embodiment, the processor is further configured to at least facilitate controlling the emissions by initiating cold start emission reduction control, in accordance with instructions provided by the processor, when each of the following criteria are satisfied, namely: the running time for the engine is greater than a first predetermined threshold; the ambient temperature is greater than a second predetermined threshold; and a difference between the engine temperature and the ambient temperature is less than a third predetermined threshold.

Also in an exemplary embodiment: the first predetermined threshold is equal to approximately six (6) hours; the second predetermined threshold is equal to approximately negative seven degrees Celsius (−7° C.); and the third predetermined threshold is equal to approximately fifteen degrees Celsius (15° C.).

Also in an exemplary embodiment, the processor is further configured to at least facilitate initiating the cold start emission reduction control by providing heating for a catalytic converter of the drive system, in accordance with the instructions provided by the processor, when each of the following criteria are satisfied, namely: the running time for the engine is greater than the first predetermined threshold; the ambient temperature is greater than the second predetermined threshold; and the difference between the engine temperature and the ambient temperature is less than the third predetermined threshold.

Also in an exemplary embodiment, the processor is further configured to at least facilitate initiating the cold start emission reduction control by performing diagnostics for the drive system, in accordance with the instructions provided by the processor, when each of the following criteria are satisfied, namely: the running time for the engine is greater than the first predetermined threshold; the ambient temperature is greater than the second predetermined threshold; and the difference between the engine temperature and the ambient temperature is less than the third predetermined threshold.

Also in an exemplary embodiment, the diagnostics pertain to one or more of the following: fuel pressure; idle speed control; variable valve timing and/or lift; split and/or multiple injections; charge motion control, intake runner, or swirl control valves; and electronic wastegate position.

Also in an exemplary embodiment, the processor is further configured to at least facilitate initiating the cold start emission reduction control by increasing idle speeds for the engine, in accordance with the instructions provided by the processor, when each of the following criteria are satisfied, namely: the running time for the engine is greater than the first predetermined threshold; the ambient temperature is greater than the second predetermined threshold; and the difference between the engine temperature and the ambient temperature is less than the third predetermined threshold.

Also in an exemplary embodiment, the processor is further configured to at least facilitate initiating the cold start emission reduction control by reducing spark for the engine, in accordance with the instructions provided by the processor, when each of the following criteria are satisfied, namely: the running time for the engine is greater than the first predetermined threshold; the ambient temperature is greater than the second predetermined threshold; and the difference between the engine temperature and the ambient temperature is less than the third predetermined threshold.

Also in an exemplary embodiment, the processor is further configured to at least facilitate initiating the cold start emission reduction control by modifying control of one or more of the following: fuel pressure, valve timing, and waste gate control, in accordance with the instructions provided by the processor, when each of the following criteria are satisfied, namely: the running time for the engine is greater than the first predetermined threshold; the ambient temperature is greater than the second predetermined threshold; and the difference between the engine temperature and the ambient temperature is less than the third predetermined threshold.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
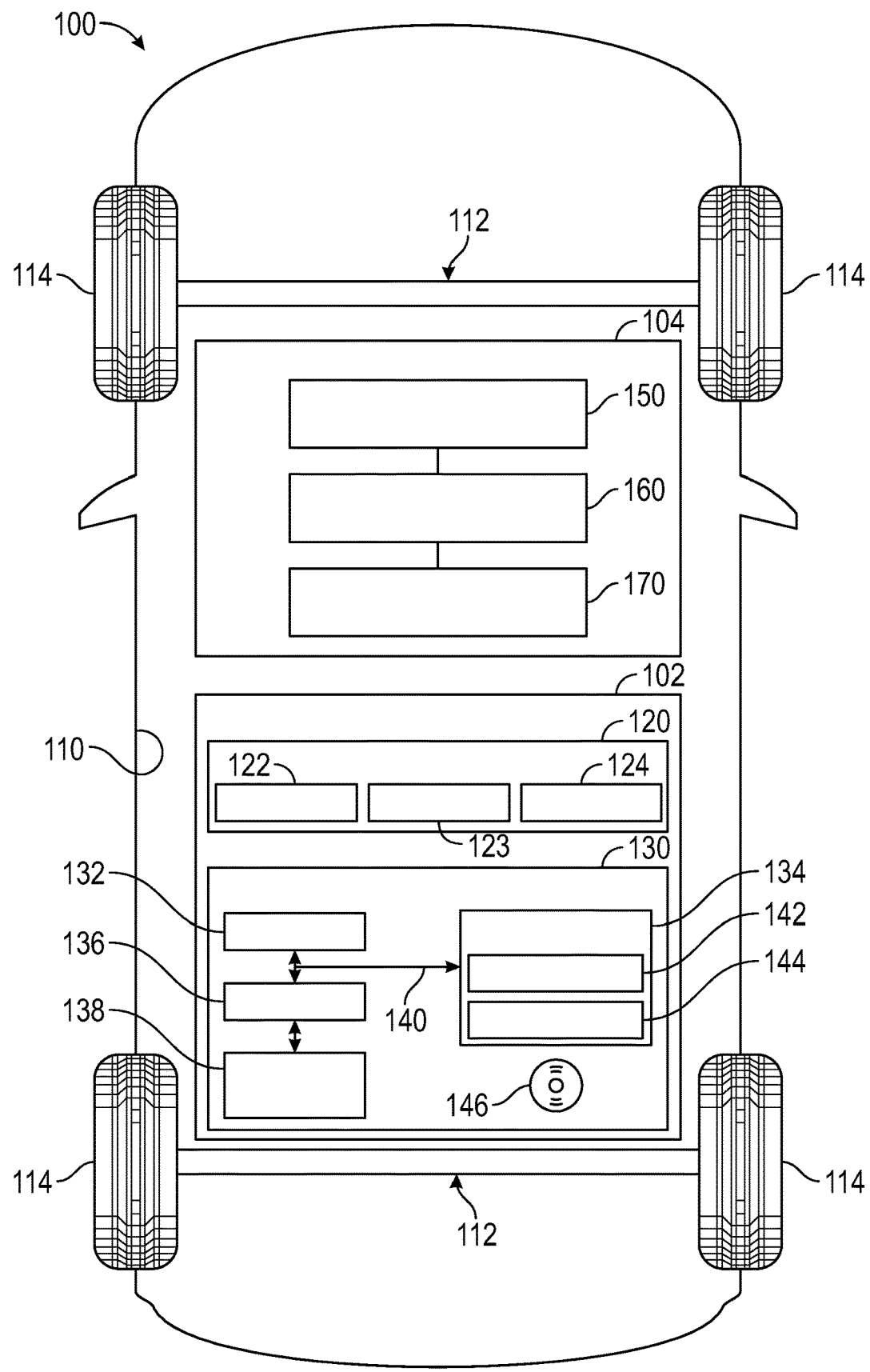
FIG. 1 is a functional block diagram of a vehicle that includes a drive system having an engine and a catalytic converter, and control system that is used for controlling emissions of the drive system based on temperature, in accordance with an exemplary embodiment.

FIG. 1 illustrates a vehicle 100, according to an exemplary embodiment. As described in greater detail further below, the vehicle 100 includes a drive system 104 as well as a control system 102 that controls emissions of the drive system 104 based on temperature, in accordance with an exemplary embodiment.

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle and/or one or more other types of vehicles. In addition, in various embodiments, it will also be appreciated that the vehicle 100 may comprise any number of other types of mobile platforms.

In the depicted embodiment, the vehicle 100 includes a body 110 that substantially encloses other components of the vehicle 100. Also in the depicted embodiment, the vehicle 100 includes a plurality of axles 112 and wheels 114. The wheels 114 are each rotationally coupled to one or more of the axles 112 near a respective corner of the body 110 to facilitate movement of the vehicle 100. In one embodiment, the vehicle 100 includes four wheels 114, although this may vary in other embodiments (for example for trucks and certain other vehicles).

The drive system 104 drives the wheels 114. In the depicted embodiment, the drive system 104 comprises a propulsion system, and includes an engine 150, a catalytic converter 160, and a heating element 170. In various embodiments, the engine 150 comprises an internal combustion engine, such as a gasoline or diesel fueled combustion engine. Also in various embodiments, the catalytic converter treats exhaust from the engine 150 in order to reduce emissions from the engine 150 and the drive system 104. In addition, in various embodiments, the heating element 170 provides heating for the catalytic converter 160 under appropriate conditions, for example based on the temperature inside the drive system 104 and/or based on the ambient temperature outside the vehicle 100 as well as an amount of time in which the engine 150 has been running.

In various embodiments, the control system 102 provides instructions for controlling the drive system 104, including in order to control emission reductions for the drive system 104 based on one or more temperatures of the engine 150 and/or the environment outside the vehicle. In various embodiments, the control system 102 provides these functions as described further below in connection with the process 200 of FIG. 2.

As depicted in FIG. 1, in various embodiments, the control system 102 includes a sensor array 120 and a controller 130.

In various embodiments, the sensor array 120 includes various sensors for measuring sensor data, including temperatures inside and outside the vehicle 100 and a duration in which the engine 150 has been running. As depicted in FIG. 1, in various embodiments, the sensor array 120 includes one or more engine temperature sensors 122, ambient temperature sensors 123, and ignition sensors 124.

In various embodiments, one or more engine temperature sensors 122 measure a temperature related to the engine 150 inside the vehicle 100. In certain embodiments, the engine temperature sensors 122 comprise engine coolant sensors that are disposed in proximity to the engine 150 and that measure temperature of the engine coolant for the engine 150. In addition, in certain embodiments, the one or more ambient temperature sensors 123 are disposed on an exterior of the vehicle 100, and measure an ambient temperature outside the vehicle 100. Also in various embodiments, the one or more ignition sensors sense when the engine 150 is running.

Also in various embodiments, the controller 130 is coupled to the sensor array 120, and provides instructions for controlling the emissions of the drive system 104 based on measurements and/or determinations from sensor data obtained from the sensors of the sensor array 120, including the engine temperature, ambient temperature, and amount of time in which the engine 150 has been running. As depicted in FIG. 1, in various embodiments, the controller 130 comprises a computer system comprising a processor 132, a memory 134, an interface, a storage device 138, a bus 140, and a disk 146.

As depicted in FIG. 1, the controller 130 comprises a computer system. In certain embodiments, the controller 130 may also include the sensor array 120 and/or one or more other vehicle components. In addition, it will be appreciated that the controller 130 may otherwise differ from the embodiment depicted in FIG. 1. For example, the controller 130 may be coupled to or may otherwise utilize one or more remote computer systems and/or other control systems, for example as part of one or more of the above-identified vehicle devices and systems.

In the depicted embodiment, the computer system of the controller 130 includes a processor 132, a memory 134, an interface 136, a storage device 138, and a bus 140. The processor 132 performs the computation and control functions of the controller 130, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the controller 130 and the computer system of the controller 130, generally in executing the processes described herein, such as the process 200 discussed further below in connection with FIG. 2.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 142 along with one or more stored values 144 (e.g., including, in various embodiments, predetermined threshold values for controlling emissions of the drive system).

The bus 140 serves to transmit programs, data, status and other information or signals between the various components of the computer system of the controller 130. The interface 136 allows communications to the computer system of the controller 130, for example from a system driver and/or another computer system, and can be implemented using any suitable method and apparatus. In one embodiment, the interface 136 obtains the various data from the sensor array 120, the drive system 104, the drive system 104, and/or one or more other components and/or systems of the vehicle 100. The interface 136 can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including various different types of direct access storage and/or other memory devices. In one exemplary embodiment, the storage device 138 comprises a program product from which memory 134 can receive a program 142 that executes one or more embodiments of one or more processes of the present disclosure, such as the steps of the process 200 discussed further below in connection with FIG. 2. In another exemplary embodiment, the program product may be directly stored in and/or otherwise accessed by the memory 134 and/or one or more other disks 146 and/or other memory devices.

The bus 140 can be any suitable physical or logical means of connecting computer systems and components. This includes, but is not limited to, direct hard-wired connections, fiber optics, infrared and wireless bus technologies. During operation, the program 142 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 130 may also otherwise differ from the embodiment depicted in FIG. 1, for example in that the computer system of the controller 130 may be coupled to or may otherwise utilize one or more remote computer systems and/or other control systems.

Figure 2:
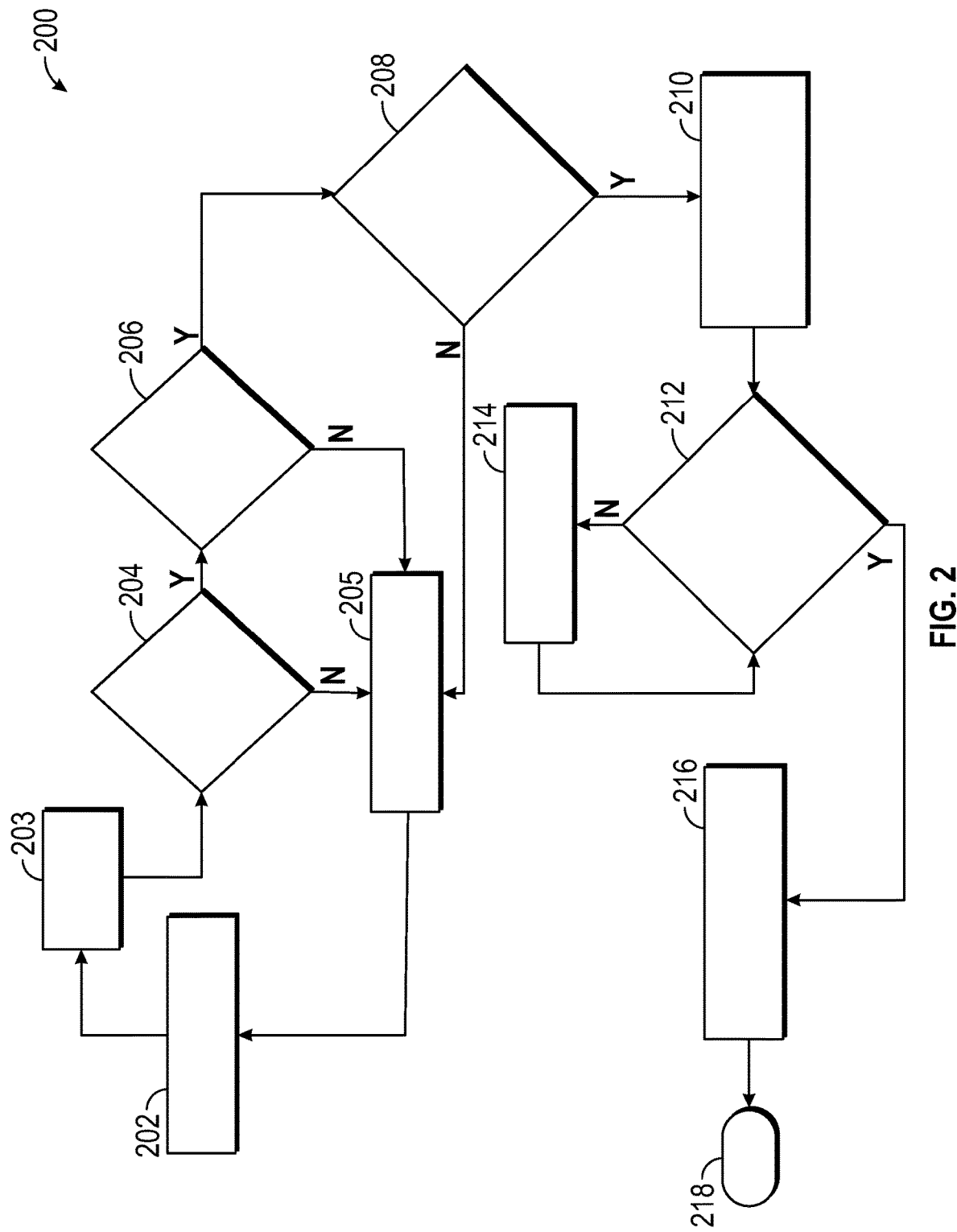
FIG. 2 is a flowchart of a process for controlling emissions of the drive system based on engine temperature, and an amount of time in which the engine has been running, and that can be implemented in connection with the vehicle of FIG. 1, in accordance with an exemplary embodiment.

FIG. 2 is a flowchart of a process 200 for controlling emissions of a drive system of a vehicle based on engine temperature, and an amount of time in which the engine has been running, in accordance with an exemplary embodiment. In various embodiments, the process 200 may be implemented in connection with the vehicle 100 of FIG. 1, including the drive system 104 and control system 102 thereof.

As depicted in FIG. 2, in various embodiments the process 200 begins at 202. In certain embodiments, the process 200 begins when one or more events occur to indicate that a vehicle drive is taking place or about to take place, such as a driver, operator, or passenger entering the vehicle 100, an engine or motor of the vehicle 100 being turned on, a transmission of the vehicle 100 being placed in a "drive" mode, or the like. In certain embodiments, the control system 102 is turned on, or "woken up" as part of step 202.

Sensor data is collected at 203. In various embodiments, sensor data is collected from various sensors of the sensor array 120 of FIG. 1. In various embodiments, sensor data is obtained as to the engine temperature, ambient temperature, and running time of the engine from the engine temperature sensors 122, ambient temperature sensors 123, and ignition sensors 124, respectively, of FIG. 1 and provided to the processor 132 of the control system 102 of FIG. 1 for processing.

A determination is made as to whether the engine has been running for a running time that is greater than a predetermined amount of time (step 204). In various embodiments, this determination is made by the processor 132 of FIG. 1 from sensor data obtained from the ignition sensors 124 of FIG. 1. Also in various embodiments, the predetermined amount time of step 204 comprises a first predetermined threshold that is stored in the memory 134 as a stored value 144 thereof. In various embodiments, the running time refers to a current, continuous running time during a current ignition cycle. Also in certain embodiments, the first predetermined threshold of step 204 is equal to six (6) hours; however, this may vary in other embodiments.

In certain embodiments, if it is determined in step 204 that the engine has not been running for a running time that is greater than the first predetermined threshold, then no current action is taken (step 205). Instead, in various embodiments, the process returns to step 202 in a new iteration, and steps 202-205 thereafter repeat until a determination is made during an iteration of step 204 that the engine has been running for a running time that is greater than the first predetermined threshold of step 204.

Conversely, also in certain embodiments, if it is instead determined in step 204 that the engine has not been running for a running time that is greater than the first predetermined threshold of step 204, then the process proceeds instead to step 206. During step 206, a determination is made as to whether the ambient temperature is greater than a second predetermined threshold. In various embodiments, this determination is made by the processor 132 of FIG. 1 from sensor data obtained from the ambient temperature sensors 123 of FIG. 1 as to a temperature of ambient air that is just outside of and surrounding the vehicle 100. Also in various embodiments, the second predetermined threshold of step 206 is stored in the memory 134 as a stored value 144 thereof. In various embodiments, the second predetermined threshold of step 206 is equal to negative seven degrees Celsius (−7° C.); however, this may vary in other embodiments.

In certain embodiments, if it is determined in step 206 that the ambient temperature is greater than the second predetermined threshold of step 206, then the process proceeds to the above-mentioned step 205, as no current action is taken. Instead, in various embodiments, the process returns to step 202 in a new iteration, and steps 202-206 thereafter repeat until a determination is made during an iteration of step 206 that the ambient temperature is greater than the second predetermined threshold of step 206.

Conversely, also in certain embodiments, if it is instead determined in step 206 that the ambient temperature is not greater than the second predetermined threshold of step 206, then the process proceeds instead to step 208. During step 208, a determination is made as to whether a difference between the engine temperature and the ambient temperature is less than a third predetermined threshold. In various embodiments, this determination is made by the processor 132 of FIG. 1 from sensor data obtained from the engine temperature sensors 122 and the ambient temperature sensors 123 of FIG. 1 as to whether a difference between the engine temperature (e.g., from the engine coolant) minus the ambient temperature (e.g., the air right outside the vehicle 100) is less than the third predetermined threshold. Also in various embodiments, the third predetermined threshold of step 206 is stored in the memory 134 as a stored value 144 thereof. In various embodiments, the third predetermined threshold of step 208 is equal to fifteen degrees Celsius (15° C.); however, this may vary in other embodiments.

In certain embodiments, if it is determined in step 208 that the difference between the engine temperature and the ambient temperature is not less than the third predetermined threshold of step 208, then the process proceeds to the above-mentioned step 205, as no current action is taken. Instead, in various embodiments, the process returns to step 202 in a new iteration, and steps 202-208 thereafter repeat until a determination is made during an iteration of step 208 that the difference between the engine temperature and the ambient temperature is less than the third predetermined threshold.

Conversely, also in certain embodiments, if it is instead determined in step 208 that the difference between the engine temperature and the ambient temperature is less than the third predetermined threshold of step 208, then the process proceeds instead to step 210. During step 210, a cold start emission reduction flag is enabled. In various embodiments, the cold start emission reduction flag is enabled by the processor 132 of FIG. 1.

In various embodiments, a determination is made as to whether cold start emission reduction control has already been enabled (step 212). In various embodiments, this determination is made by the processor 132 of FIG. 1.

In various embodiments, if it is determined in step 212 that the cold start emission reduction control has not yet been enabled, then the process proceeds to step 214. In various embodiments, during step 214, cold start reduction control is enabled. In various embodiments, the cold start reduction control is enabled in accordance with instructions provided by the processor 132 of FIG. 1.

Also in various embodiments, as part of the cold start reduction control, during step 214 various cold start emission reduction control functions are implemented by the drive system 104 of FIG. 1 (and/or one or more component thereof and/or systems coupled thereto) in accordance with the instructions provided by the processor 132 of FIG. 1. In various embodiments, the cold start emission reduction control functions comprise one or more changes in the drive system 104 in order to control emissions produced therefrom to the environment. In certain embodiments, heating is initiated and/or increased for the catalytic converter 160 by the heating element 170. In certain embodiments, diagnostics are performed with respect to one or more components of or related to the drive system 104, including one or more (or, in certain embodiments, all) of the following: (i) fuel pressure; (ii) idle speed control; (iii) variable valve timing and/or lift; (iv) split and/or multiple injections (e.g., missing pulses); (v) charge motion control, intake runner, or swirl control valves; and/or (vi) electronic wastegate position. In certain embodiments, the diagnostics of one or more of these categories are different from, and use different thresholds for determining faults and/or diagnostic trouble codes with respect to such components and/or conditions, as compared with diagnostics under other circumstances. In addition, in certain embodiments, the cold start emission reduction control functions also provide one or more (and, in certain embodiments, all) of the following: elevating idle speeds; retarding spark; modified fuel pressure control; modified valve timing (e.g., with a different number of injections); and waste gate control, among other possible controls and changes thereto.

Conversely, in various embodiments, if it is instead determined in step 212 that the cold start emission reduction control has already been enabled, then the process proceeds to step 216. In various embodiments, during step 216, the cold start emission reduction control flag remains enabled until the cold start emission reduction control is finished. In certain embodiments, the process 200 then terminates at 218.

Accordingly, methods, systems, and vehicles are provided that can control vehicle emissions for a cold engine start. In various embodiments, the emission control is based on engine temperature, ambient temperature, and an amount of time in which the engine has been running. Also in various embodiments, the emission control provides heating of the catalytic converter, altered diagnostics for the drive system, and/or altered control of one or more features of the drive system based on these conditions.

It will be appreciated that the systems, vehicles, applications, and implementations may vary from those depicted in the Figures and described herein. For example, in various embodiments, the vehicle 100, control system 102, drive system 104, components thereof, and/or other components may differ from those depicted in FIG. 1 and/or described above in connection therewith. It will also be appreciated that the steps of the process 200 may differ, and/or that various steps thereof may be performed simultaneously and/or in a different order, than those depicted in FIG. 2 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling emissions for a drive system for a vehicle, the method comprising:
   measuring, via one or more first sensors, an engine temperature pertaining to an engine of the vehicle;
   measuring, via one or more second sensors, an ambient temperature surrounding the vehicle;
   detecting, via one or more third sensors, an amount of running time in which the engine has been running; and
   controlling emissions for the drive system, via a processor of the vehicle, based on the engine temperature, the ambient temperature, and the amount of running time in which the engine has been running.

2. The method of claim 1, wherein the step of controlling the emissions comprises initiating cold start emission reduction control, in accordance with instructions provided by the processor, when each of the following criteria are satisfied, namely:
   the running time for the engine is greater than a first predetermined threshold;
   the ambient temperature is greater than a second predetermined threshold; and
   a difference between the engine temperature and the ambient temperature is less than a third predetermined threshold.

3. The method of claim 2, wherein:
   the first predetermined threshold is equal to approximately six (6) hours;
   the second predetermined threshold is equal to approximately negative seven degrees Celsius (−7° C.); and
   the third predetermined threshold is equal to approximately fifteen degrees Celsius (15° C.).

4. The method of claim 2, wherein the step of initiating the cold start emission reduction control comprises providing heating for a catalytic converter of the drive system, in accordance with the instructions provided by the processor, when each of the following criteria are satisfied, namely:
   the running time for the engine is greater than the first predetermined threshold;
   the ambient temperature is greater than the second predetermined threshold; and
   the difference between the engine temperature and the ambient temperature is less than the third predetermined threshold.

5. The method of claim 2, wherein the step of initiating the cold start emission reduction control comprises performing diagnostics for the drive system, in accordance with the instructions provided by the processor, when each of the following criteria are satisfied, namely:
the running time for the engine is greater than the first predetermined threshold;
the ambient temperature is greater than the second predetermined threshold; and
the difference between the engine temperature and the ambient temperature is less than the third predetermined threshold.

6. The method of claim 5, wherein the diagnostics pertain to one or more of the following: fuel pressure; idle speed control; variable valve timing and/or lift; split and/or multiple injections; charge motion control, intake runner, or swirl control valves; and electronic wastegate position.

7. The method of claim 2, wherein the step of initiating the cold start emission reduction control comprises increasing idle speeds for the engine, in accordance with the instructions provided by the processor, when each of the following criteria are satisfied, namely:
the running time for the engine is greater than the first predetermined threshold;
the ambient temperature is greater than the second predetermined threshold; and
the difference between the engine temperature and the ambient temperature is less than the third predetermined threshold.

8. The method of claim 2, wherein the step of initiating the cold start emission reduction control comprises reducing spark for the engine, in accordance with the instructions provided by the processor, when each of the following criteria are satisfied, namely:
the running time for the engine is greater than the first predetermined threshold;
the ambient temperature is greater than the second predetermined threshold; and
the difference between the engine temperature and the ambient temperature is less than the third predetermined threshold.

9. The method of claim 2, wherein the step of initiating the cold start emission reduction control comprises modifying control of one or more of the following: fuel pressure, valve timing, and waste gate control, in accordance with the instructions provided by the processor, when each of the following criteria are satisfied, namely:
the running time for the engine is greater than the first predetermined threshold;
the ambient temperature is greater than the second predetermined threshold; and
the difference between the engine temperature and the ambient temperature is less than the third predetermined threshold.

10. A system for controlling emissions for a drive system for a vehicle, the system comprising:
one or more first sensors configured to measure an engine temperature pertaining to an engine of the vehicle;
one or more second sensors configured to measure an ambient temperature surrounding the vehicle;
one or more third sensors configured to detect an amount of running time in which the engine has been running; and
a processor coupled to the one or more first sensors, the one or more second sensors, and the one or more third sensors and configured to at least facilitate controlling emissions for the drive system based on the engine temperature, the ambient temperature, and the amount of running time in which the engine has been running.

11. The system of claim 10, wherein the processor is further configured to at least facilitate controlling the emissions by initiating cold start emission reduction control, in accordance with instructions provided by the processor, when each of the following criteria are satisfied, namely:
the running time for the engine is greater than a first predetermined threshold;
the ambient temperature is greater than a second predetermined threshold; and
a difference between the engine temperature and the ambient temperature is less than a third predetermined threshold.

12. A vehicle comprising:
a drive system; and
a control system comprising:
one or more first sensors configured to measure an engine temperature pertaining to an engine of the vehicle;
one or more second sensors configured to measure an ambient temperature surrounding the vehicle;
one or more third sensors configured to detect an amount of running time in which the engine has been running; and
a processor coupled to the one or more first sensors, the one or more second sensors, and the one or more third sensors and configured to at least facilitate controlling emissions for the drive system based on the engine temperature, the ambient temperature, and the amount of running time in which the engine has been running.

13. The vehicle of claim 12, wherein the processor is further configured to at least facilitate controlling the emissions by initiating cold start emission reduction control, in accordance with instructions provided by the processor, when each of the following criteria are satisfied, namely:
the running time for the engine is greater than a first predetermined threshold;
the ambient temperature is greater than a second predetermined threshold; and
a difference between the engine temperature and the ambient temperature is less than a third predetermined threshold.

14. The vehicle of claim 13, wherein:
the first predetermined threshold is equal to approximately six (6) hours;
the second predetermined threshold is equal to approximately negative seven degrees Celsius (−7° C.); and
the third predetermined threshold is equal to approximately fifteen degrees Celsius (15° C.).

15. The vehicle of claim 13, wherein the processor is further configured to at least facilitate initiating the cold start emission reduction control by providing heating for a catalytic converter of the drive system, in accordance with the instructions provided by the processor, when each of the following criteria are satisfied, namely:
the running time for the engine is greater than the first predetermined threshold;
the ambient temperature is greater than the second predetermined threshold; and
the difference between the engine temperature and the ambient temperature is less than the third predetermined threshold.

16. The vehicle of claim 13, wherein the processor is further configured to at least facilitate initiating the cold start emission reduction control by performing diagnostics for the drive system, in accordance with the instructions provided by the processor, when each of the following criteria are satisfied, namely:

the running time for the engine is greater than the first predetermined threshold;

the ambient temperature is greater than the second predetermined threshold; and the difference between the engine temperature and the ambient temperature is less than the third predetermined threshold.

17. The vehicle of claim 16, wherein the diagnostics pertain to one or more of the following: fuel pressure; idle speed control; variable valve timing and/or lift; split and/or multiple injections; charge motion control, intake runner, or swirl control valves; and electronic wastegate position.

18. The vehicle of claim 13, wherein the processor is further configured to at least facilitate initiating the cold start emission reduction control by increasing idle speeds for the engine, in accordance with the instructions provided by the processor, when each of the following criteria are satisfied, namely:

the running time for the engine is greater than the first predetermined threshold;

the ambient temperature is greater than the second predetermined threshold; and the difference between the engine temperature and the ambient temperature is less than the third predetermined threshold.

19. The vehicle of claim 13, wherein the processor is further configured to at least facilitate initiating the cold start emission reduction control by reducing spark for the engine, in accordance with the instructions provided by the processor, when each of the following criteria are satisfied, namely:

the running time for the engine is greater than the first predetermined threshold;

the ambient temperature is greater than the second predetermined threshold; and the difference between the engine temperature and the ambient temperature is less than the third predetermined threshold.

20. The vehicle of claim 13, wherein the processor is further configured to at least facilitate initiating the cold start emission reduction control by modifying control of one or more of the following: fuel pressure, valve timing, and waste gate control, in accordance with the instructions provided by the processor, when each of the following criteria are satisfied, namely:

the running time for the engine is greater than the first predetermined threshold;

the ambient temperature is greater than the second predetermined threshold; and the difference between the engine temperature and the ambient temperature is less than the third predetermined threshold.

* * * * *